United States Patent
Spryshak et al.

(10) Patent No.: US 10,414,239 B2
(45) Date of Patent: Sep. 17, 2019

(54) FLUID FLOW CONTROLLER

(71) Applicant: Valeo Climate Control Corp, Auburn Hills, MI (US)

(72) Inventors: Joseph Spryshak, Hartland, MI (US); Richard Sikorski, Macomb Township, MI (US); Earl Buckman, Warren, MI (US)

(73) Assignee: Valeo Climate Control Corp., Auburn Hills, MI (US)

( * ) Notice: Subject to any disclaimer, the term of this patent is extended or adjusted under 35 U.S.C. 154(b) by 574 days.

(21) Appl. No.: 15/136,911

(22) Filed: Apr. 23, 2016

(65) Prior Publication Data
US 2017/0305229 A1 Oct. 26, 2017

(51) Int. Cl.
*F24F 7/00* (2006.01)
*B60H 1/00* (2006.01)

(52) U.S. Cl.
CPC ..... *B60H 1/00021* (2013.01); *B60H 1/00564* (2013.01)

(58) Field of Classification Search
CPC ............ B60H 1/00021; B60H 1/00564; B60H 1/00842; B60H 1/00857; B60H 1/00678; B60H 1/0065

USPC .............. 454/121, 69, 155, 75, 265, 93, 309
See application file for complete search history.

(56) References Cited

U.S. PATENT DOCUMENTS

| | | | |
|---|---|---|---|
| 5,036,753 A * | 8/1991 | Ostrand ................. | B60H 1/345 454/155 |
| 5,797,585 A | 8/1998 | Auvity | |
| 9,004,464 B2 | 4/2015 | Hazama et al. | |
| 9,022,367 B2 | 5/2015 | Katsuta | |
| 2010/0126072 A1* | 5/2010 | Kim ................... | B60H 1/00842 49/94 |
| 2010/0237550 A1 | 9/2010 | Kubota | |

* cited by examiner

*Primary Examiner* — Vivek K Shirsat
(74) *Attorney, Agent, or Firm* — Dierker & Kavanaugh, P.C.

(57) ABSTRACT

A fluid flow controller includes a housing defining a first and a second fluid path. A first door is in the first fluid path to selectably control a first flow through the first fluid path in response to a rotation of a first lever. A second door is in the second fluid path to selectably control a second flow through the second fluid path in response to a rotation of a second lever. A flexible kinematic link is to connect an actuator arm rotatable about an actuator arm axis to the first lever via first pin joints for rotation of the first door about the first pivot axis. A flexible link length is responsive to a compressive and a tensile load. A rigid link is to connect the actuator arm to the second lever via second pin joints for rotation of the second door about the second pivot axis.

9 Claims, 7 Drawing Sheets

FLUID FLOW CONTROLLER

BACKGROUND

HVAC (Heating Ventilation and Air Conditioning) systems are used for climate control of, e.g., internal cabin areas of an automobile. HVAC systems may be configured with an HVAC unit having a heat exchanger disposed in a housing. An HVAC distribution system may be operatively connected to the HVAC unit. An HVAC system may have one or more airflow paths for allowing air to flow, for example, to, from, and/or within the HVAC unit and the HVAC distribution system. Doors may be associated with the airflow path for controlling the amount of air flowing to, through, and/or from the HVAC unit and/or the HVAC distribution system.

SUMMARY

A fluid flow controller includes a housing defining a first fluid path and a second fluid path. A first door is disposed in the first fluid path to selectably control a first flow through the first fluid path in response to a rotation of a first lever. A second door is disposed in the second fluid path to selectably control a second flow through the second fluid path in response to a rotation of a second lever. An actuator arm is rotatable about an actuator arm axis. A flexible kinematic link is to connect the actuator arm to the first lever via first pin joints for rotation of the first door about the first pivot axis. A flexible link length of the flexible kinematic link is responsive to a compressive load and a tensile load. A rigid link is to connect the actuator arm to the second lever via second pin joints for rotation of the second door about the second pivot axis.

BRIEF DESCRIPTION OF THE DRAWINGS

Features of examples of the present disclosure will become apparent by reference to the following detailed description and drawings, in which like reference numerals correspond to the same or similar, though perhaps not identical, components. For the sake of brevity, reference numerals or features having a previously described function may or may not be described in connection with other drawings in which they appear.

DETAILED DESCRIPTION

Examples of the fluid flow controller 10 of the present disclosure may be an HVAC module 14 that includes a housing 12, a blower (not shown), an evaporator 17, and a heater core 15 located downstream of the evaporator 17. The evaporator 17 is to provide cold air and the heater core 15 is to provide hot air. These components are typical components for an HVAC module and operate similarly to the components in a conventional HVAC module. Thus, the operation of the blower, evaporator 17, and heater core 15 will not be explained in further detail. In some of the drawings of the present disclosure, cold air flowing from the evaporator 17 is represented by arrows designated with the letter "C". Hot air flowing from the heater core 15 is represented by arrows designated with the letter "H". The mixture of hot and cold air is represented by arrows designated with the letter "M". Further, any reference to "volume of air" or "airflow" in the specification does not specifically refer to cold air, hot air or mixed air but rather is just a generic term used for simplicity.

Some HVAC modules have two doors for controlling the proportion of air that flows into the heater core, or around the heater core. The output temperature of the air can be controlled by controlling the proportion of cold air that gets heated by the heater core. The proportion of cold air that gets heated by the heater core is referred to as the "blend". Costs can be reduced by actuating two doors in a two-door blend control system with a single actuator. To coordinate sealing of both doors at the same time, doors may be repeatably made with close tolerances, and the doors may be precisely located in the HVAC module housing. Kinematic linkages may be made to tight specifications and close tolerances.

The doors in a two-door blend control system may be referred to as a driven door, and a slave door. The driven door would normally be the door that is used to provide feedback to the control system in a closed loop system, or the door that is used to calibrate the ends of motion in an open loop system. For example, when the driven door achieves the proper seal compression, the tolerance stack-up through the kinematics and the slave door must be precise enough that the slave door also achieves the proper seal. It may be desirable to avoid having to calibrate or adjust every door during production of a large quantity of HVAC systems. Therefore, adjustment may be made during development, and variation in the system may be constrained.

If the driven door compresses its seals too much, the actuator may stall before the slave door reaches proper seal compression, resulting in a leak at the slave door. On the other hand, if the driven door does not apply enough compression to the seal, the driven door seal may leak. Elements of the kinematic linkage chain may be selected or adjusted to achieve the precise geometry for both doors to seal in a particular position, for example at the end of counter-clockwise travel. However, the selection or adjustment may have a deleterious impact to the sealing of the doors in another position, for example at the end of clockwise travel. For example, to increase the counter-clockwise seal of the driven door, the kinematic link between the actuator and the driven door may be selected or adjusted to be longer. However, a longer kinematic link may prevent the driven door from reaching the other seal surface when the actuator is in the fully clockwise position.

For two-door systems controlled by one actuator, existing kinematic links may not provide the desired motion of the slave door relative to the driven door. Existing systems may use additional parts to control the motion of the doors, such as a cam. However, increased parts may undesirably increase complexity, mass and cost.

Examples of the present disclosure include a flexible kinematic link 20 to allow a single actuator 59 to control two blend doors. In the present disclosure, the first door 30 and the second door 31 may be barrel blend doors. One or more flexible kinematic links 20 are flexible in a single plane, such that the first door 30 that is driven by that flexible kinematic link 20 can achieve a seal with the housing prior to the other doors in the system. The actuator 59 continues motion to seal the other doors; the flexible kinematic link 20 compresses or stretches to prevent over-compression of the seal of the first door 30, and to prevent high forces on the other elements in the kinematic linkage chain. When the actuator moves in the opposite direction, the flexible kinematic link 20 can again allow the first door 30 to achieve a seal prior to the other doors of the system; and again flex to avoid high forces to the other elements of the kinematic linkage chain while the other doors continue motion to achieve their seals.

The connection of the flexible kinematic link 20 to other parts of the kinematic linkage chain is such that forces are mirrored and balanced symmetrically about the plane in which the strain of the flexible kinematic link 20 occurs. In this manner, the stresses within the flexible kinematic link 20 are minimized and the durability of the flexible kinematic link 20 is maximized.

As disclosed herein, sealing of two or more doors can be robust to greater variation in the elements of the kinematic linkage chain. As used herein, robustness has the meaning attributed to Genichi Taguchi, "the state where the technology, product, or process performance is minimally sensitive to factors causing variability (either in the manufacturing or users environment) and aging at the lowest unit manufacturing cost." In examples of the present disclosure, tolerances for links, doors and housings can be larger, saving tooling cost and making the products more robust. According to the present disclosure, use of a cam can be avoided. A cam-less kinematic linkage chain may also provide a production cycle time reduction and piece cost savings compared to a system using a cam.

Figure 1:
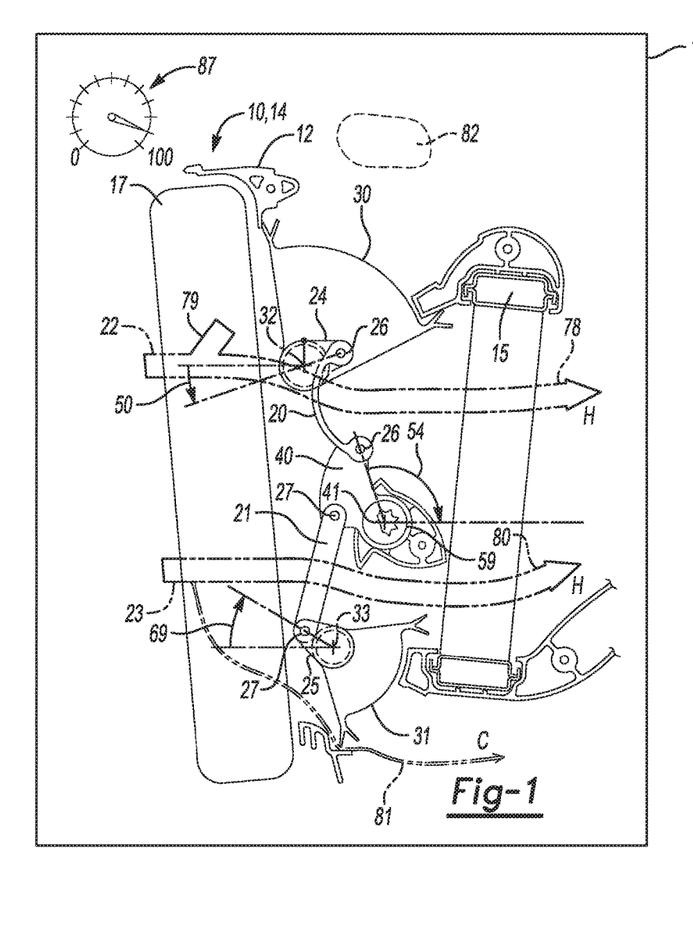
FIG. 1 is a semi-schematic side view of an example of a fluid flow controller with the first door in the first door first position according to the present disclosure.

FIG. 1 is a semi-schematic side view of an example of a fluid flow controller 10 according to the present disclosure. In examples of the present disclosure, the fluid flow may be airflow in a heating, ventilation and air conditioning (HVAC) module 14 for a vehicle 16. As depicted in FIG. 1, the fluid flow controller 10 includes a housing 12 defining a first fluid path 22 and a second fluid path 23. In the example depicted in FIG. 1, the fluid flow controller 10 is an HVAC module 14 for a vehicle 16 and the fluid is air. A first door 30 is disposed in the first fluid path 22 to selectably control a first flow through the first fluid path 22 in response to a rotation of a first lever 24. The first fluid path 22 may have a first hot branch 78 and a first cold branch 79. The proportion of flow in the first hot branch 78 and the first cold branch 79 depends on the position of the first door 30.

A second door 31 is disposed in the second fluid path 23 to selectably control a second flow through the second fluid path 23 in response to a rotation of a second lever 25. The second fluid path 23 may have a second hot branch 80 and a second cold branch 81. The proportion of flow in the second hot branch 80 and the second cold branch 81 depends on the position of the second door 31.

An actuator arm 40 is rotatable about an actuator arm axis 41. The actuator arm axis 41 is fixed in the housing 12. A flexible kinematic link 20 is to connect the actuator arm 40 to the first lever 24 via first pin joints 26 for rotation of the first door 30 about the first pivot axis 32. A flexible link length 28 (see FIG. 9D) of the flexible kinematic link 20 is responsive to a compressive load 34 (see FIG. 2) and a tensile load 35 (see FIG. 5). A rigid kinematic link 21 is to connect the actuator arm 40 to the second lever 25 via second pin joints 27 for rotation of the second door 31 about the second pivot axis 33.

The first door 30 is rotatable about a first pivot axis 32 defined in the housing 12 from a first door first position 50 to a first door second position 51. The first door 30 is shown in the first door second position 51 in FIG. 4 and FIG. 5. The second door 31 is rotatable about a second pivot axis 33 defined in the housing 12 from a second door first position 52 (FIG. 2) to a second door second position 53 (FIG. 5). The first door first position 50 corresponds to a first actuator arm angle 54 with the flexible kinematic link 20 unloaded. As depicted in FIG. 1, the first door first position 50 is a rotational position of the first door 30 at which the seals are touching their seats and the first door 30 directs all of the air in the first fluid path 22 through the first hot branch 78.

Figure 2:
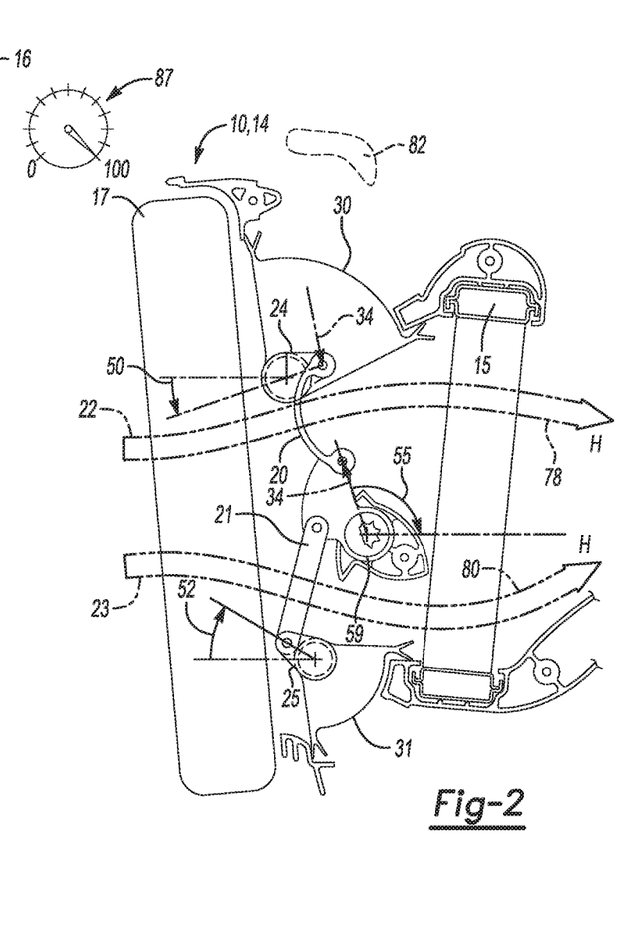
FIG. 2 is a semi-schematic side view of the example of the fluid flow controller depicted in FIG. 1 with the first door in the first door first position and the second door in the second door first position according to the present disclosure.

The second door first position 52 corresponds to a second actuator arm angle 55 (see FIG. 2). As depicted in FIG. 2, the second door first position 52 is a rotational position of the second door 31 at which the seals are touching their seats and the second door 31 directs all of the air in the second fluid path 23 through the second hot branch 80.

Figure 4:
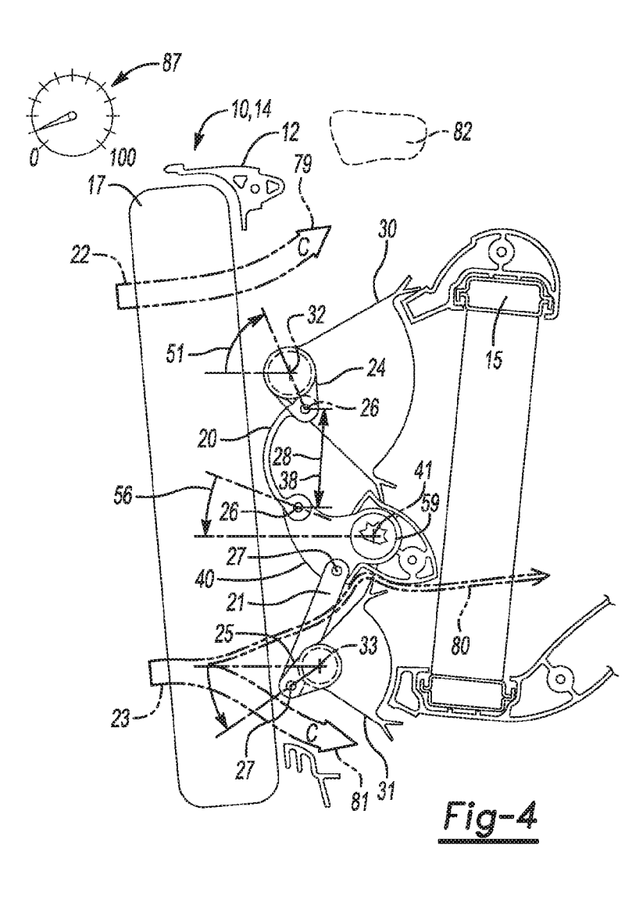
FIG. 4 is a semi-schematic side view of the example of the fluid flow controller depicted in FIG. 1 with the first door in the first door second position.
Figure 5:
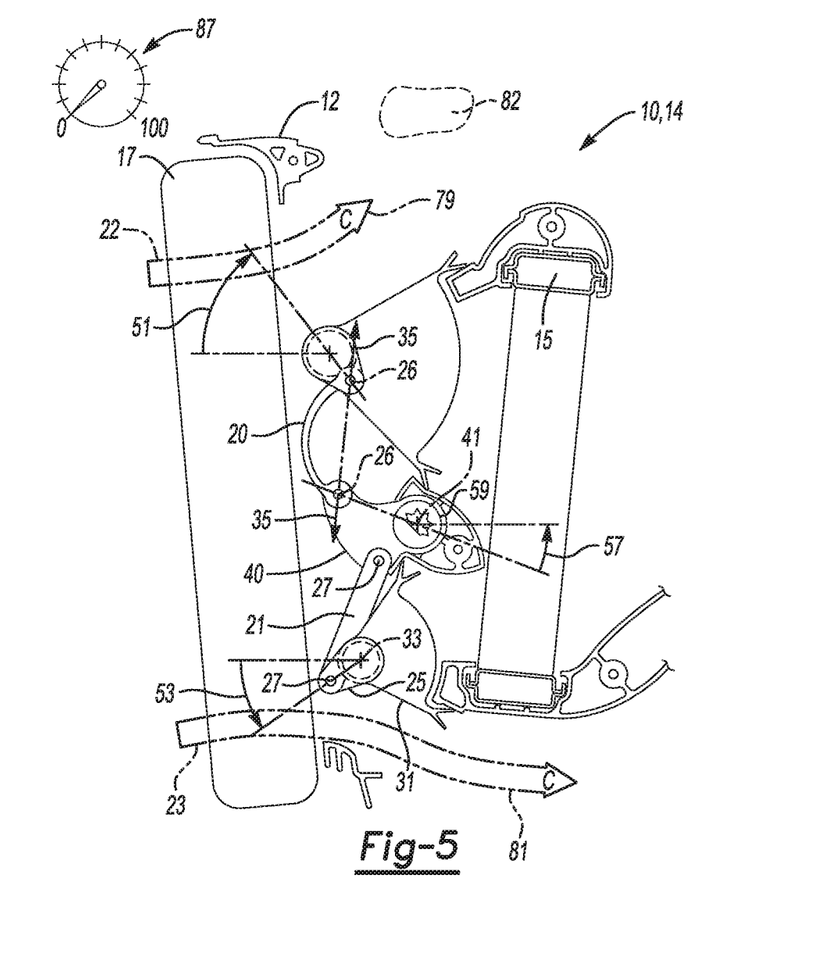
FIG. 5 is a semi-schematic side view of the example of the fluid flow controller depicted in FIG. 1 with the first door in the first door second position and the second door in the second door second position according to the present disclosure.

The first door second position 51 corresponds to a third actuator arm angle 56 with the flexible kinematic link 20 unloaded (see FIG. 4). As depicted in FIG. 4, the first door second position 51 is a rotational position of the first door 30 at which the seals are touching their seats and the first door 30 directs all of the air in the first fluid path 22 through the first cold branch 79.

The second door second position 53 corresponds to a fourth actuator arm angle 57 (see FIG. 5). As depicted in FIG. 5, the second door second position 53 is a rotational position of the second door 31 at which the seals are touching their seats and the second door 31 directs all of the air in the second fluid path 23 through the second cold branch 81.

FIG. 2 is a semi-schematic side view of the example of the fluid flow controller 10 depicted in FIG. 1 with the first door 30 in the first door first position 50 and the second door 31 in the second door first position 52 according to the present disclosure. In the example depicted in FIG. 2, the first door first position 50 corresponds to the second actuator arm angle 55 with the flexible kinematic link 20 loaded. As used herein, the term "loaded" means subjected to tension or compression. The arrows indicating compressive load 34 are directed toward each other to indicate compression in the example depicted in FIG. 2.

Figure 3:
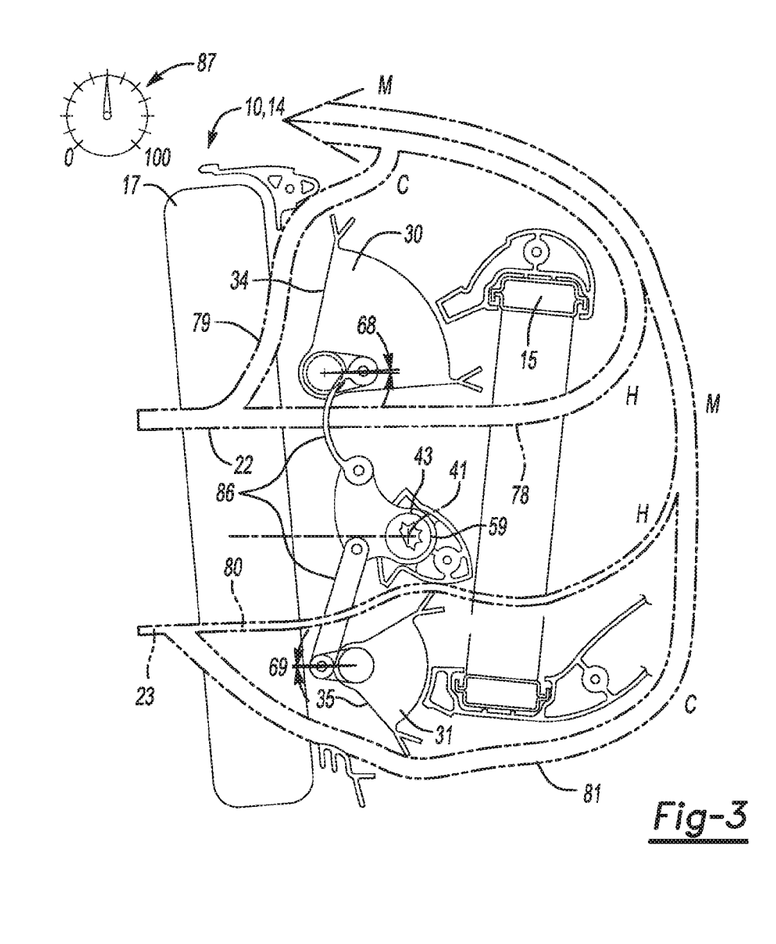
FIG. 3 is a semi-schematic side view of the example of the fluid flow controller depicted in FIG. 1 with the first door in a first door intermediate position and the second door in a second door intermediate position according to the present disclosure.

FIG. 3 is a semi-schematic side view of the example of the fluid flow controller 10 depicted in FIG. 1 with the first door 30 in a first door intermediate position 68 and the second door 31 in a second door intermediate position 69 according to the present disclosure. As depicted in FIG. 3, the reference numerals 68 and 69 indicate that the reference lines indicating the position of the first door 30 and the second door 31 are both approximately horizontal. The datum from which the angles are measured may be any suitable angle. Therefore, the first door intermediate position 68 indicated in FIG. 3 could be 90 degrees from vertical; and the second door intermediate position 69 indicated in FIG. 3 could be about 90 degrees from vertical. The first door intermediate position 68 is anywhere between the first door first position 50 (FIG. 1 and FIG. 2) and the first door second position 51 (FIG. 4 and FIG. 5). A second door intermediate position 69 is between the second door first position 52 (FIG. 2) and the second door second position 53 (FIG. 5). Therefore FIG. 1 also shows the second door 31 in a second door intermediate position 69.

FIG. 4 is a semi-schematic side view of the example of the fluid flow controller 10 depicted in FIG. 1 with the first door 30 in the first door second position 51. In the example depicted in FIG. 4, the first door second position 51 corresponds to the third actuator arm angle 56 with the flexible kinematic link 20 unloaded. The flexible kinematic link 20 is shown with the flexible link length 28 equal to the unloaded length 38. As depicted in FIG. 4, 100 percent of the flow in the first fluid path 22 flows in the first cold branch 79 and zero percent of the flow in the first fluid path 22 flows in the first hot branch 78. In FIG. 4, most of the flow in the second fluid path 23 flows in the second cold branch 81 and a small amount of the flow in the second fluid path 23 flows in the second hot branch 80.

FIG. 5 is a semi-schematic side view of the example of the fluid flow controller 10 depicted in FIG. 1 with the first door 30 in the first door second position 51 and the second door 31 in the second door second position 53 according to the present disclosure. In the example depicted in FIG. 5, the first door second position 51 corresponds to the fourth actuator arm angle 57 with the flexible kinematic link 20 loaded. The arrows indicating tensile load 35 are directed away from each other to indicate tension in the example depicted in FIG. 5. As stated above, the second door second position 53 also corresponds to the fourth actuator arm angle 57. Therefore, when the actuator moves the actuator arm 40 to the fourth actuator arm angle 57, the first door 30 is in the first door second position 51 and the second door 31 is in the second door second position 53. Since the flexible kinematic link 20 is loaded, the flexible kinematic link 20 becomes shorter or longer to automatically adjust and cause both doors 30, 31 to achieve their respective second positions 51, 53 without overloading any of the seals. In the example depicted in FIG. 2, the flexible kinematic link 20 becomes shorter. In the example depicted in FIG. 5, the flexible kinematic link becomes longer.

In examples of the present disclosure, the HVAC module 14 may have a temperature setpoint 87 with a range of settings from 0 percent module heat to 100 percent module heat. In FIGS. 1-5, the temperature setpoint 87 is represented by a dial. The dial may represent a knob on the instrument control cluster of a vehicle. When full heat is desired, the knob is turned to the 100 percent module heat setting. In some vehicles, the knob is turned fully to the "red" side. When full cold is desired, the knob is turned to the 0 percent module heat setting. In some vehicles, the knob is turned fully to the "blue" side for full cold. In other vehicles, an automatic climate control system may control the temperature setpoint 87.

In an example of the present disclosure, the first door blend setting ranges from 100 percent first door cold (FIG. 4 and FIG. 5) to 100 percent first door hot (FIG. 1 and FIG. 2). 100 percent first door cold (FIG. 4 and FIG. 5) corresponds to 100 percent of the flow in the first fluid path 22 flowing in the first cold branch 79 and zero percent of the flow in the first fluid path 22 flowing in the first hot branch 78. 100 percent first door hot (FIG. 1 and FIG. 2) corresponds to zero percent of the flow in the first fluid path 22 flowing in the first cold branch 79 and 100 percent of the flow in the first fluid path 22 flowing in the first hot branch 78. 100 percent of the flow in the first fluid path 22 is divided between the first cold branch 79 and the first hot branch 78 by the first door 30.

The second door blend setting ranges from 100 percent second door cold (FIG. 5) to 100 percent second door hot (FIG. 2). 100 percent second door cold (FIG. 5) corresponds to 100 percent of the flow in the second fluid path 23 flowing in the second cold branch 81 and zero percent of the flow in the second fluid path 23 flowing in the second hot branch 80. 100 percent second door hot (FIG. 2) corresponds to zero percent of the flow in the second fluid path 23 flowing in the second cold branch 81 and 100 percent of the flow in the second fluid path 23 flowing in the second hot branch 80. 100 percent of the flow in the second fluid path 23 is divided between the second cold branch 81 and the second hot branch 80 by the second door 31.

In an example, the first door blend setting may remain at 100 percent first door hot, and the second door blend setting may account for all of the cool air entering the blend zone 82 for all temperature setpoint 87 settings between 100 percent module heat (FIG. 2) and about 90 percent module heat (FIG. 1). A single actuator 59 may control rotation of the first door 30 and rotation of the second door 31 via kinematic links 86 (see FIG. 3). Even though a single actuator 59 controls the respective rotations of both the first door 30 and the second door 31, the doors do not necessarily move equally. By beginning movement away from 100 percent hot with the smaller blend door (second door 31), fine control of the temperature may be achieved.

Figure 6:
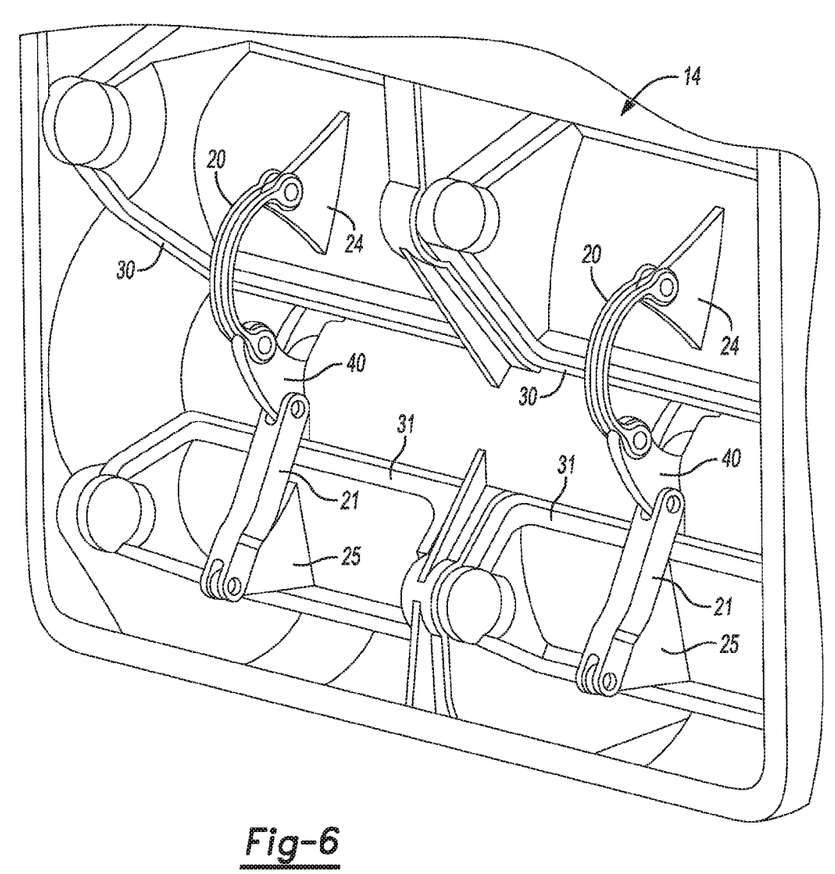
FIG. 6 is a semi-schematic interior perspective view of an example of a fluid flow controller depicting blend doors and kinematic linkage for a dual-zone climate control system according to the present disclosure.

FIG. 6 is a semi-schematic interior view of an HVAC module 14 depicting blend doors for a dual-zone climate control system. A dual-zone climate control system may have two sets of temperature controls: one for the driver and one for the front passenger. Some vehicles have "tri-zone" or "quad-zone" climate control. These third and fourth zones may be for rear passengers. Examples of the present disclosure may be adapted to such multi-zone climate control systems by including a first door 30 and a second door 31 as blend doors for each zone of the multi-zone climate control system. As shown in FIG. 6, the left side controls the blend for a first climate control zone, and the right side controls the blend for a second climate control zone. Each zone has an actuator arm 40 connected to a rotary actuator. A flexible kinematic link 20 connects the actuator arm 40 to a first lever 24 to rotate the first door 30. A rigid kinematic link 21 connects the actuator arm 40 to the second lever 25 to rotate the second door 31.

Figure 7:
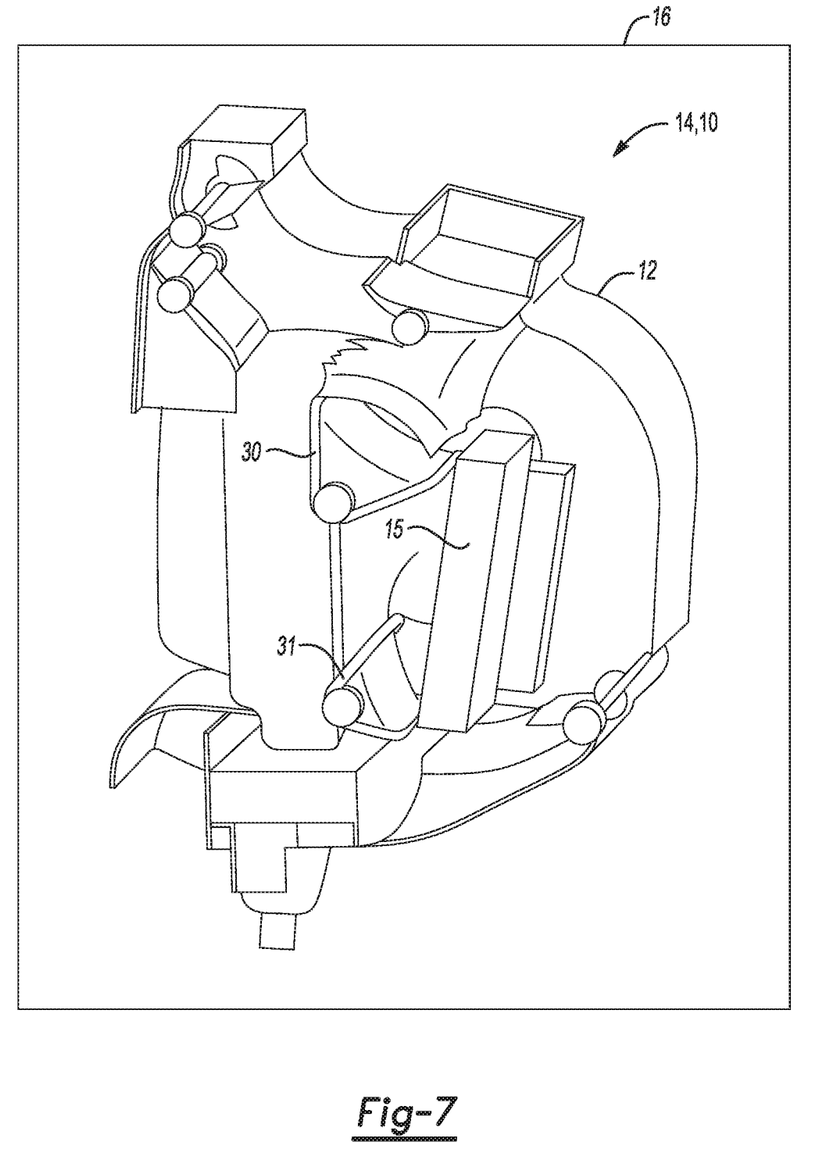
FIG. 7 is semi-schematic interior side perspective view depicting a portion of an example of a fluid flow controller according to the present disclosure.

FIG. 7 is semi-schematic interior side perspective view depicting a portion of a fluid flow controller 10 according to the present disclosure. The fluid flow controller 10 is an HVAC module 14. In FIG. 7, a portion of the housing 12 has been cut away, and the evaporator is not shown. The heater core 15 has been cut vertically. In the example depicted in FIG. 7, the first door 30 is larger than the second door 31.

Figure 8:
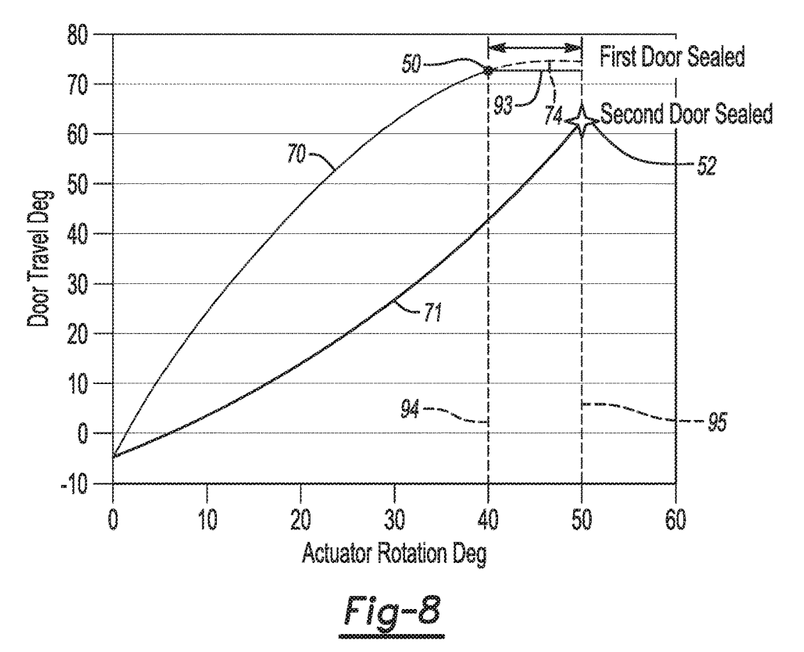
FIG. 8 is a graph depicting blend door travel vs. actuator rotation for an example of the present disclosure.

FIG. 8 is a graph depicting blend door travel vs. actuator rotation for an example of the present disclosure. The first door travel 70 of the first door 30 is depicted by the upper curve in FIG. 8. The second door travel 71 of the second door 31 is depicted by the lower curve in FIG. 8. The kinematic arrangements cause the first door 30 and the second door 31 to travel different angles even though the doors are driven by the same actuator. The vertical line 94 is constructed at the actuator rotation angle that corresponds to the first door 30 being in the first door first position 50. In other words, the first door 30 is sealed when the actuator rotation angle is about 40 degrees in FIG. 8. The horizontal line 93 beginning at 50 between vertical line 94 and vertical line 95 in FIG. 8 indicates that the first door 30 does not continue to rotate even though the actuator continues to rotate from about 40 degrees to about 50 degrees. The arcuate line 74 beginning at 50 between vertical line 94 and vertical line 95 in FIG. 8 indicates the travel that the first door 30 would have if the flexible kinematic link 20 were replaced by a rigid link. The distance between arcuate line 74 and horizontal line 93 indicates an amount of over compression of the seals on the first door 30 that is prevented by the flexing of the flexible kinematic link 20. At an actuator rotation angle of about 50 degrees, the second door is sealed as indicated at reference numeral 52.

Figure 9A:
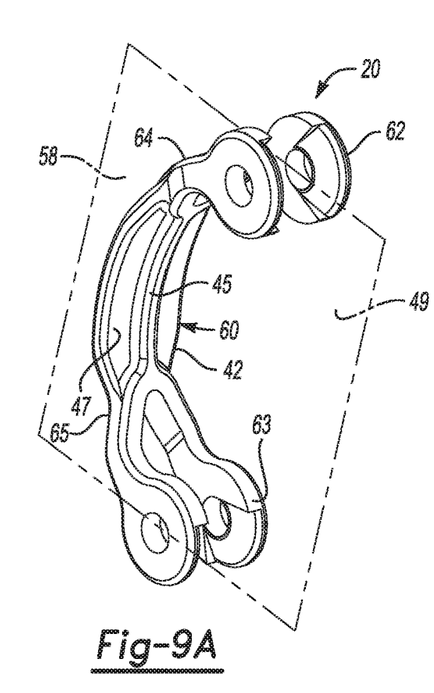
FIG. 9A is a front perspective view of an example of a flexible kinematic link according to the present disclosure.
Figure 9B:
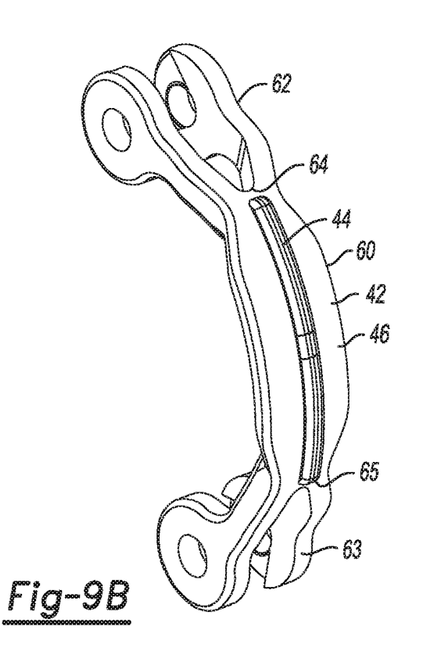
FIG. 9B is a rear perspective view of the example of the flexible kinematic link depicted in FIG. 9A according to the present disclosure.
Figure 9C:
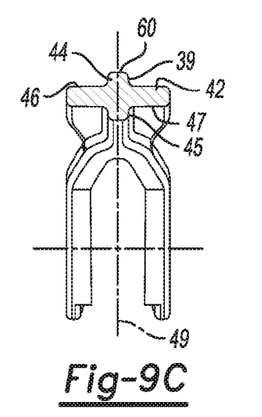
FIG. 9C is a section view of the example of the flexible kinematic link depicted in FIG. 9A, along line 9C-9C as indicated in FIG. 9G.
Figure 9D:
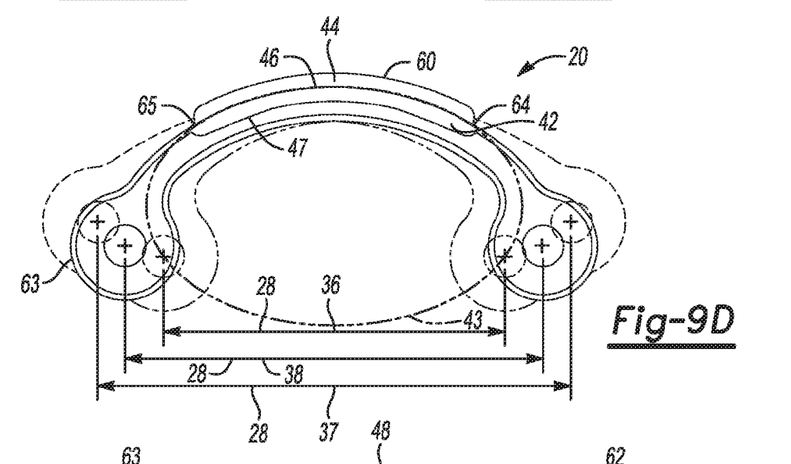
FIG. 9D is a side view of the example of the flexible kinematic link depicted in FIG. 9A according to the present disclosure.
Figure 9E:
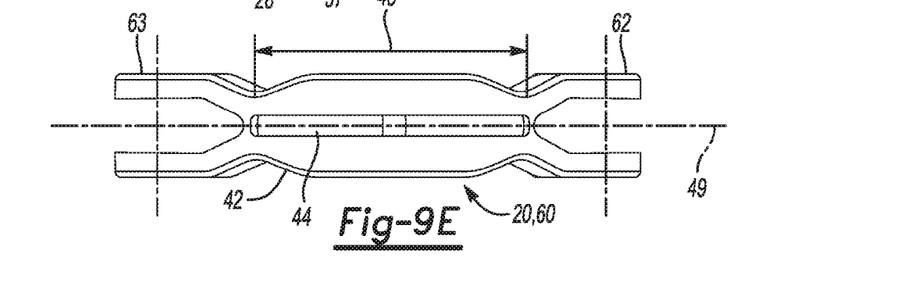
FIG. 9E is a top view of the example of the flexible kinematic link depicted in FIG. 9A according to the present disclosure.
Figure 9F:
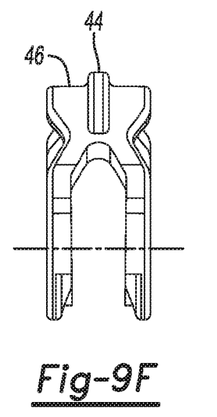
FIG. 9F is an end view of the example of the flexible kinematic link depicted in FIG. 9A according to the present disclosure.
Figure 9G:
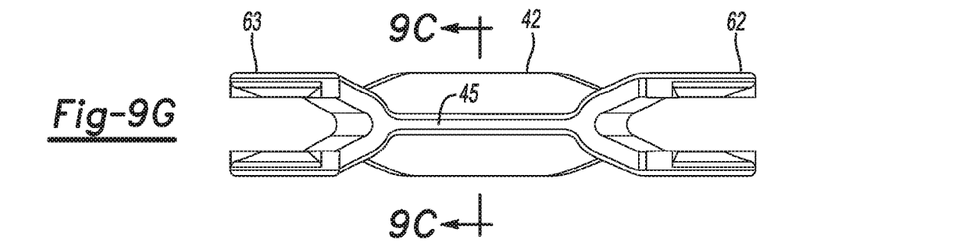
FIG. 9G is a bottom view of the example of the flexible kinematic link depicted in FIG. 9A according to the present disclosure.

FIGS. 9A-9G together depict an example of a flexible kinematic link 20 according to the present disclosure. The flexible kinematic link 20 includes a bow spring 60, and is flexible in both tension and compression. The flexible kinematic link 20 has a first clevis 62 disposed at a first end 64 of the bow spring 60 and a second clevis 63 at a second end 65 of the bow spring 60 opposite to the first end 64. The flexible link length 28 of the flexible kinematic link 20 is a distance 29 between the first clevis 62 and the second clevis 63. The flexible link length 28 is responsive to a load. In the example depicted in FIG. 9D, the flexible link length 28 is the distance between centers of the clevis pins as shown. A compressive load 34 (see FIG. 2) causes the bow spring 60 to bend thereby reducing the flexible link length 28 to a compressed length 36 of the flexible kinematic link 20 shorter than an unloaded length 38 of the flexible kinematic link 20 as shown in FIG. 9D. A tensile load 35 causes the bow spring 60 to bend thereby increasing the flexible link length 28 to a tensile length 37 of the flexible kinematic link 20 longer than the unloaded length 38 of the flexible kinematic link 20 as shown in FIG. 9D.

The example of the bow spring 60 depicted in FIGS. 9A-9G has a cruciform cross-section 39 best seen in FIG. 9C. The bow spring 60 has a main flange 42 extending from the first clevis 62 to the second clevis 63. The main flange 42 defines an elliptical arc 43 when the flexible kinematic link 20 is in an unloaded state. The bow spring 60 has a convex web 44 on a convex surface 46 of the main flange 42. The convex web 44 is orthogonal to the main flange 42. The bow spring 60 has a concave web 45 defined on a concave surface 47 of the main flange 42 (see FIG. 9A). The concave web 45 is orthogonal to the main flange 42. In examples of the present disclosure, the convex web 44 and the concave web 45 may distribute stress evenly along the length 48 of the main flange 42 when the flexible kinematic link 20 is loaded in tension or compression. Such even distribution of stress optimizes the durability of the flexible kinematic link 20. A medial plane 49 (see FIG. 9E) may be defined parallel to a flexural plane 58 (see FIG. 9A) of the flexible kinematic link 20 such that the flexible kinematic link 20 has bilateral symmetry about the medial plane 49. Such symmetry causes the bow spring 60 to remain in the flexural plane 58 when the flexible kinematic link 20 flexes, thereby reducing side loads that could reduce durability.

Although the present disclosure has presented detail related to examples implemented in an automotive HVAC application, it is to be understood that the disclosure is not limited to automotive applications or the control of airflow. For example, a flow of water or glycol may be controlled by an example of a fluid flow controller of the present disclosure. Further, examples of the present disclosure may be applied to residential or commercial building HVAC systems.

It is to be understood that the ranges provided herein include the stated range and any value or sub-range within the stated range. For example, a range of from about 40 degrees to about 50 degrees should be interpreted to include not only the explicitly recited limits of about 40 degrees to about 50 degrees, but also to include individual values, such as 42 degrees, 46.5 degrees, etc., and sub-ranges, such as from about 44 degrees to 48 degrees, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

The terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in communication with the other component (notwithstanding the presence of one or more additional components therebetween). Additionally, two components may be permanently, semi-permanently, or releasably engaged with and/or connected to one another.

It is to be further understood that "communication" is to be construed to include all forms of communication, including direct and indirect communication. Indirect communication may include communication between two components with additional component(s) located therebetween.

While several examples have been described in detail, it is to be understood that the disclosed examples may be modified. Therefore, the foregoing description is to be considered non-limiting.

What is claimed is:

1. A fluid flow controller, comprising:
   a housing defining a first fluid path and a second fluid path;
   a first door disposed in the first fluid path to selectably control a first flow through the first fluid path in response to a rotation of a first lever;
   a second door disposed in the second fluid path to selectably control a second flow through the second fluid path in response to a rotation of a second lever;
   an actuator arm rotatable about an actuator arm axis;
   a flexible kinematic link to connect the actuator arm to the first lever via first pin joints for rotation of the first door about a first pivot axis wherein a flexible link length of the flexible kinematic link is responsive to a compressive load and a tensile load; and
   a rigid link to connect the actuator arm to the second lever via second pin joints for rotation of the second door about a second pivot axis.

2. The fluid flow controller as defined in claim 1 wherein:
   the first door is rotatable about the first pivot axis defined in the housing from a first door first position to a first door second position;
   the second door is rotatable about the second pivot axis defined in the housing from a second door first position to a second door second position;
   the first door first position corresponds to a first actuator arm angle with the flexible kinematic link unloaded;
   the second door first position corresponds to a second actuator arm angle;
   the first door second position corresponds to a third actuator arm angle with the flexible kinematic link unloaded; and
   the second door second position corresponds to a fourth actuator arm angle, wherein each of the first actuator arm angle, the second actuator arm angle, the third actuator arm angle and the fourth actuator arm angle is a distinct actuator arm angle.

3. The fluid flow controller as defined in claim 2 wherein the first door first position corresponds to the second actuator arm angle with the flexible kinematic link loaded.

4. The fluid flow controller as defined in claim 2 wherein the first door second position corresponds to the fourth actuator arm angle with the flexible kinematic link loaded.

5. The fluid flow controller as defined in claim 1 wherein:
   the flexible kinematic link includes a bow spring;
   the flexible kinematic link has a first clevis disposed at a first end of the bow spring and a second clevis at a second end of the bow spring opposite to the first end;
   the flexible link length of the flexible kinematic link is a distance between the first clevis and the second clevis;
   the compressive load causes the bow spring to bend thereby making a compressed length of the flexible kinematic link shorter than an unloaded length of the flexible kinematic link; and
   the tensile load causes the bow spring to bend thereby making a tensile length of the flexible kinematic link longer than the unloaded length of the flexible kinematic link.

6. The fluid flow controller as defined in claim 5 wherein:
   the bow spring has a cruciform cross-section;
   the bow spring has a main flange extending from the first clevis to the second clevis;
   the main flange defines an elliptical arc when the flexible kinematic link is in an unloaded state;
   the bow spring has a convex web on a convex surface of the main flange
   the convex web is orthogonal to the main flange;
   the bow spring has an concave web defined on an concave surface of the main flange; and
   the concave web is orthogonal to the main flange.

7. The fluid flow controller as defined in claim 6 wherein the convex web and the concave web distribute stress evenly along a length of the main flange when the flexible kinematic link is loaded in tension or compression.

8. The fluid flow controller as defined in claim 6 wherein a medial plane is defined parallel to a flexural plane of the flexible kinematic link such that the flexible kinematic link has bilateral symmetry about the medial plane.

9. The fluid flow controller as defined in claim 1 wherein the fluid flow controller is a heating, ventilation and air conditioning (HVAC) module for a vehicle.

* * * * *